United States Patent [19]
Britton

[11] Patent Number: 5,669,213
[45] Date of Patent: Sep. 23, 1997

[54] COUNTERROTATION MULCHING MOWER

[75] Inventor: George E. Britton, Selma, Ala.

[73] Assignee: Allied Products Corporation, Chicago, Ill.

[21] Appl. No.: 553,074

[22] Filed: Nov. 3, 1995

[51] Int. Cl.[6] .................................... A01D 34/66
[52] U.S. Cl. .................... 56/17.5; 56/255; 56/DIG. 17
[58] Field of Search ...................... 56/13.5, 16.9, 56/17.5, 255, 295, DIG. 17, DIG. 20

[56] References Cited

U.S. PATENT DOCUMENTS

| | | |
|---|---|---|
| 269,264 | 12/1882 | Cloyd . |
| 842,757 | 1/1907 | Blood . |
| 2,171,750 | 9/1939 | Hooe . |
| 2,443,027 | 6/1948 | Dishmaker . |
| 2,486,799 | 11/1949 | Oppenheim . |
| 2,504,268 | 4/1950 | Lee . |
| 2,614,440 | 10/1952 | Richey . |
| 2,701,942 | 2/1955 | Caldwell, Jr. et al. . |
| 2,795,914 | 6/1957 | Smith . |
| 2,891,369 | 6/1959 | Rietz . |
| 3,385,043 | 5/1968 | Seymore . |
| 3,478,620 | 11/1969 | Shimanckas . |
| 3,503,274 | 3/1970 | Howard . |
| 3,618,304 | 11/1971 | Hundhausen . |
| 4,090,346 | 5/1978 | Doi . |
| 4,196,568 | 4/1980 | Perry . |
| 4,287,790 | 9/1981 | Fujiwara et al. . |
| 4,526,180 | 7/1985 | Scott et al. . |
| 4,573,269 | 3/1986 | Hernandez . |
| 4,634,403 | 1/1987 | Peabody et al. . |
| 4,696,199 | 9/1987 | Fabbri . |
| 4,900,292 | 2/1990 | Berry et al. ................ 474/84 |
| 4,919,244 | 4/1990 | Bondioli .................. 192/56 R |
| 4,926,623 | 5/1990 | Fiener ........................ 56/60 |
| 5,065,639 | 11/1991 | Flanhardt et al. ........... 74/417 |
| 5,077,959 | 1/1992 | Wenzel ..................... 56/11.1 |
| 5,127,215 | 7/1992 | Wenzel ..................... 56/11.1 |
| 5,450,714 | 9/1995 | Lurwig ..................... 56/13.5 |

Primary Examiner—Terry Lee Melius
Attorney, Agent, or Firm—Lockwood, Alex, Fitzgibbon & Cummings

[57] ABSTRACT

A mulching mower is provided for mowing and mulching turf vegetation in order to reduce the size of the cut vegetation and more evenly distribute the vegetation once thus cut. Counterrotating, coaxial blade and mulching tool assemblies are provided. Each blade assembly is driven by a central shaft rotatably mounted through a drive barrel which drives the mulching tool. A belt drive assembly translates rotation at a driving sheave into rotation in two different directions at spindles positioned along the mower, each spindle including a blade and a mulching tool.

14 Claims, 5 Drawing Sheets

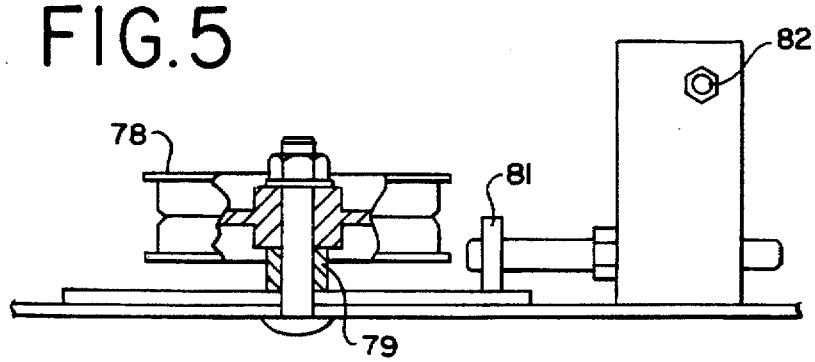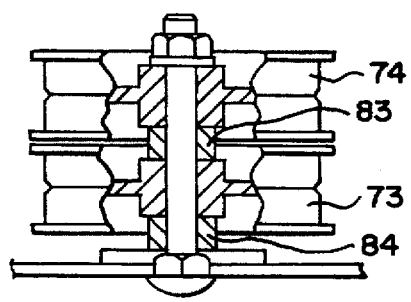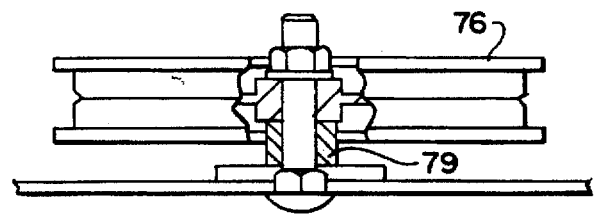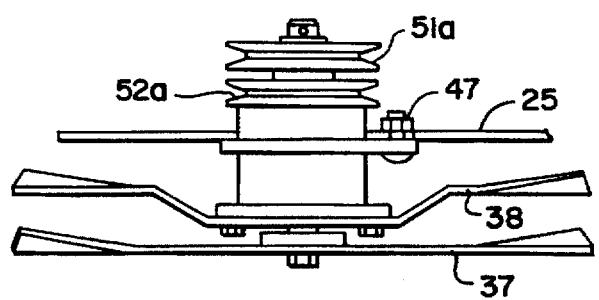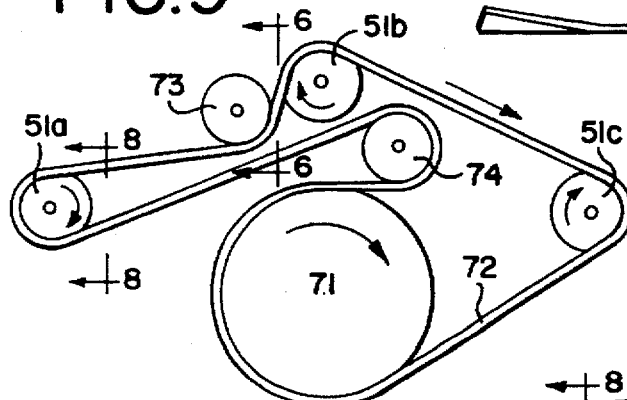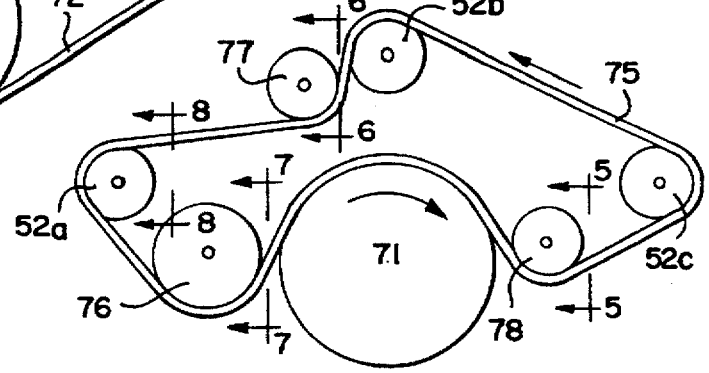

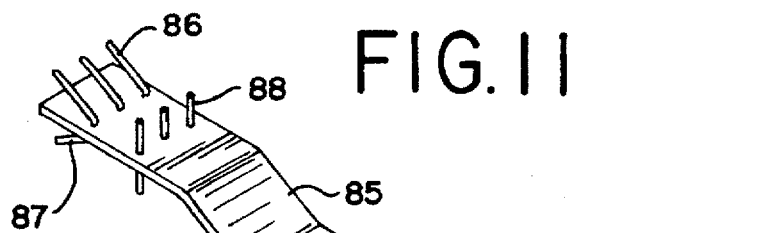
FIG. 11
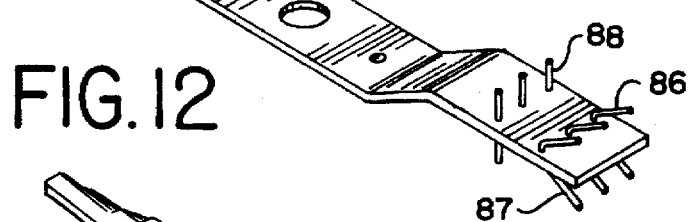
FIG. 12
FIG. 13
FIG. 14
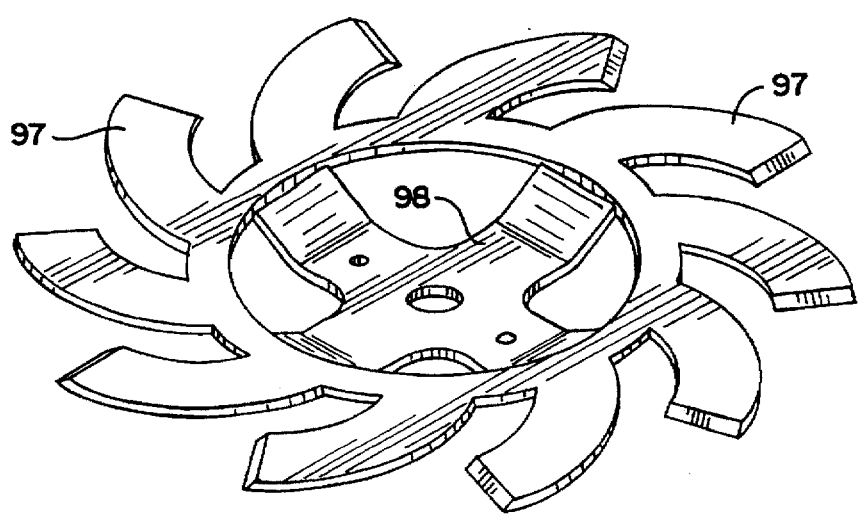

COUNTERROTATION MULCHING MOWER

BACKGROUND AND DESCRIPTION OF THE INVENTION

The present invention generally relates to finishing mowers for cutting and mulching grasses and similar vegetation by the use of double-cutting action effected by counterrotating blade and mulching tool assemblies. More particularly, the invention is a finishing mower which cuts and mulches by a plurality of cutting tools, some of which rotate in a clockwise direction and others in a counterclockwise direction, and that is particularly designed for mowing and mulching grasses and the like without discharging any visible cut material. The invention finds special application in connection with commercial turf mowing equipment, such as that designed for use on golf courses, athletic fields, large lawns, parks and turf farms.

Finishing mowers can vary in size and type, including equipment which is pulled by a pulling vehicle such as a small tractor or garden tractor and is driven by the power take-off (PTO) shaft of the pulling vehicle. Other pull-behind types of finishing mowers have their own sources of power, such as gasoline engines, these types of finishing mowers being used in connection with pulling vehicles such as smaller garden tractors without PTO capabilities, or All Terrain Vehicles. Other finishing mowers are of the self-propelled type, typically having a gasoline-powered engine which drives both the ground-engaging wheels and the cutting units. Multiple-deck finishing mowers are also available, typically as a pull-behind unit. These types of devices are intended for providing clean and low cuts so as to impart a finished and neat appearance to growing grasses. They can also be used under somewhat tougher cutting conditions, such as for light and medium grasses.

In many applications, it is important to avoid the formation of windrows or the depositing of clumps of cut grass and other foliage. Thick cut grass deposits are not only unsightly, but deterioration and decomposition of the grass is slowed considerably because the clumped grass reduces the ability of air and moisture to work on the grass clippings so that they will break down into nutrients which are useful for the growing vegetation. Approaches have been taken to provide so-called mulching mowers. Typically, these provide a modified blade design, often combined with a baffle system to hold the clippings within the cutting area in an effort to chop the clippings and deposit them under the moving mower without throwing the clippings to the side or to the rear, for example. These types of approaches have met with reasonable success, but are not particularly suitable for use in situations where the amount of foliage to be cut is anything greater than a short-to-moderate length. Often, proper mulching is accomplished when the amount of grass removed is not greater than about 1 inch and perhaps up to about 2 inches under proper conditions.

There is accordingly a need for a finishing mower that has mulching capabilities and which will allow for thorough cutting and mulching of foliage under various conditions, including grass removal lengths of up to 2½ inches and longer. In this regard, mulching should accomplish chopping of cut grass or fallen leaves, pinestraw and the like into small slivers which are not visible without careful inspection and which deteriorate more rapidly than if left whole. It is desirable to provide a mulching finishing mower that cuts and shreds longer lengths of foliage without discharge and while leaving no visible cut material.

In connection with rotary cutters, as opposed to turf mowers, it has been proposed to provide rotary cutters having double counterrotating blades in order to attempt to achieve a double-shredding action by the rotary cutter. Objectives include promoting more rapid decomposition, destruction of insects such as boll weevils, corn bores and the like, while improving evenness of spreading for reducing windrowing of cut vegetation. Such a proposed structure is found in U.S. Pat. No. 3,385,043 to Seymore. An improvement on this approach is found in U.S. Pat. No. 5,450,714 to Lurwig. These approaches utilize gearbox and drive train assemblies and are not particularly well suited for finishing mowers of the type in accordance with the present invention.

In summary, the present invention is directed to a finishing mower which has substantially enhanced mulching capabilities as discussed. The mower includes a counterrotation arrangement whereby a lower blade and an upper mulching tool rotate in a coaxial manner within a deck assembly. A belt drive assembly secured to the deck assembly has a driven output shaft in rotatable driving engagement with the lower blade and a driven output tube in rotatable driving engagement with the upper mulching tool, with the output shaft passing through this output tube. Secured thereabove are independently driven sheaves for the driven output shaft and for the driven output tube, respectively. These driven sheaves rotate in opposite directions by the operation of suitable belting moved by a main drive sheave assembly which is rotated by a power supply. In an especially advantageous arrangement, multiple counterrotation spindle assemblies are provided, and each is simultaneously driven by the belting arrangement so as to provide a plurality of pairs of counterrotating lower blade and upper mulching tool spindle assemblies.

It is a general object of the present invention to provide an improved finishing mower with counterrotating cutter elements.

Another object of this invention is to provide an improved mulching finishing mower with counterrotating cutting components that chop cut grass blades, fallen leaves, pinestraw and the like into small slivers which deteriorate more rapidly than vegetation cut into larger pieces.

Another object of the present invention is to provide an improved mulching finishing mower that incorporates two counterrotating cutter components within each cutting circle of the mower, thereby causing cut material to change directions in order to increase mulching action.

Another object of this invention is to provide an improved mulching turf mower with a belt arrangement to transmit power between the main drive sheave and the cutting spindles in order to thereby allow multiple spindles to be run in a cost-effective manner.

Another object of the present invention is to provide a mulching mower which allows multiple spindles to be run inexpensively and effectively with a counterrotation function.

Another object of this invention is to provide a finishing turf mower that accomplishes mulching action in different grasses, including the removal of up to and greater than 2½ inches and which achieves cutting and shredding without discharging or leaving behind visible cut material.

Another object of the present invention is to provide a finishing mower that will successfully mulch unusually long turf without the development of clumped foliage for areas such as sod farms, golf courses, private lawns, municipal grassy areas and recreational areas, particularly where high quality cutting of turf grasses is required.

These and other objects, features and advantages of the present invention will be clearly understood through a consideration of the following detailed description.

BRIEF DESCRIPTION OF THE DRAWINGS

The invention will be further elucidated in the following description with reference to the drawings in which:

FIG. 5 is generally cross-sectional view along the line 5—5 of FIG. 10, showing a portion of the belt drive assembly;

FIG. 6 is a generally cross-sectional view generally along the line 6—6 of FIG. 9 and of FIG. 10, showing a dual idler assembly at this location of the belt drive assembly;

FIG. 7 is a generally cross-sectional view along the line 7—7 of FIG. 10;

FIG. 8 is a generally cross-sectional view along the line 8—8 of FIG. 9 and of FIG. 10, illustrating a counterrotating double-bladed spindle assembly;

FIG. 9 is a somewhat schematic top plan view of a belt drive of a double belt drive assembly in accordance with the present invention for effecting clockwise rotation of one of the blades of each of the three spindle assemblies illustrated in this embodiment;

FIG. 10 is a generally schematic top plan view of a belt drive of a double belt drive assembly in accordance with the present invention for effecting counterclockwise rotation of the other one of the blades of each of the three spindle assemblies illustrated in this embodiment;

FIG. 11 is a perspective view of an alternative upper mulching tool for use according to the present invention;

FIG. 12 is a perspective view of another alternative upper mulching tool for use according to the present invention;

FIG. 13 is a perspective view of another alternative upper mulching tool for use according to the present invention; and FIG. 14 is a perspective view of a multi-bladed mulching tool useful as an alternative embodiment in connection with the present invention.

DESCRIPTION OF THE PARTICULAR EMBODIMENTS

Figure 1:
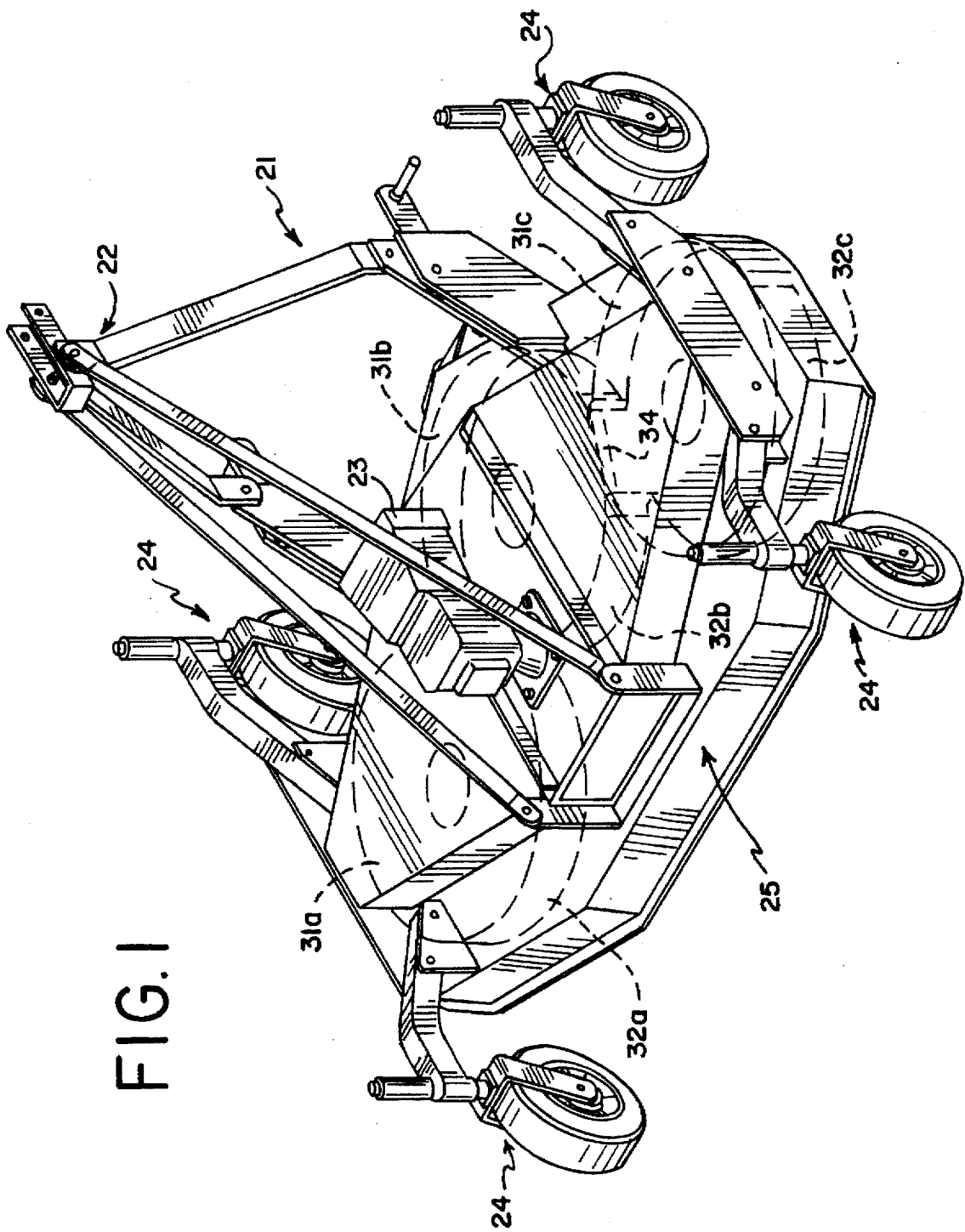
FIG. 1 is a perspective view of a finishing mower exemplifying the type of mower within which the mulching features of the present invention can be incorporated.

A finishing mower, generally designated as 21 in FIG. 1, is illustrative of the type of finishing mower within which the present invention can be embodied. It will be understood that various other types of finishing mowers can be improved by incorporating the present invention. These include finishing mowers that are single-decked and pulled by a vehicle such as a tractor and the like and powered by the vehicle through a PTO arrangement, this being the type of finishing mower illustrated in FIG. 1. Multiple-decked arrangements are also suitable for improvement in accordance with the present invention. Typical multiple-deck arrangements in this regard include a plurality of units such as the finishing mower units shown in FIG. 1 and which are tied together by suitable members such as frame components (not shown), with the result that a much wider swath is mowed by such a multi-deck finishing mower assembly.

Another type of finishing mower suitable for improvement in accordance with the present invention is also of the pull-behind type but which is self-powered, these being suitable for use with vehicles that do not have PTO capabilities. Finishing mowers according to the present invention may also be self-propelled and self-powered, such as those which are characterized by having a very short turning radius.

Figure 3:
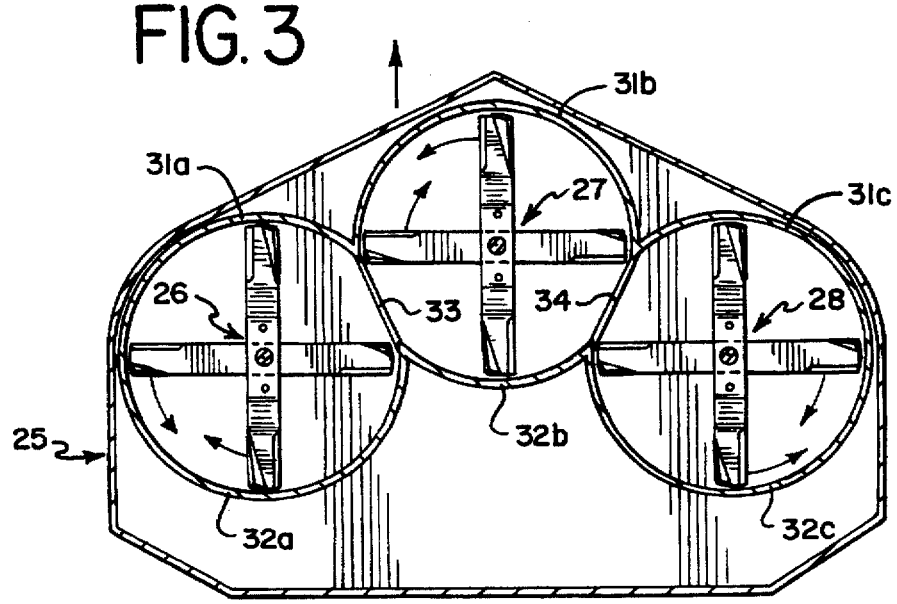
FIG. 3 is a generally horizontal cross-sectional view through the deck assembly of the embodiment shown in FIG. 1.

With further reference to the illustrated finishing mower 21, it includes a hitch assembly of a known type, sometimes referred to as a ASAE Category 1 type, in order to achieve advantageous attachment to a pulling vehicle, typically a tractor or the like. A PTO drive shaft (not shown) links the PTO unit of the pulling vehicle to the gearbox 23. It will be appreciated that, in other types of mowers, the gearbox could be substituted with some other power supply, such as an internal combustion engine or a hydraulic motor in those instances where the finishing mower is self-powered. Travel through the grassy areas to be mowed and mulched is facilitated by wheel assemblies 24 which, in the illustrated embodiment, are height-adjustable. The illustrated deck assembly 25 houses three cutting spindle assemblies, generally designated as 26, 27, 28 (FIG. 3). In the preferred arrangement which is illustrated, each cutting spindle assembly is positioned within baffles that provide a generally circular defined area designed to facilitate mulching carried out in accordance with the present invention.

Figure 2:
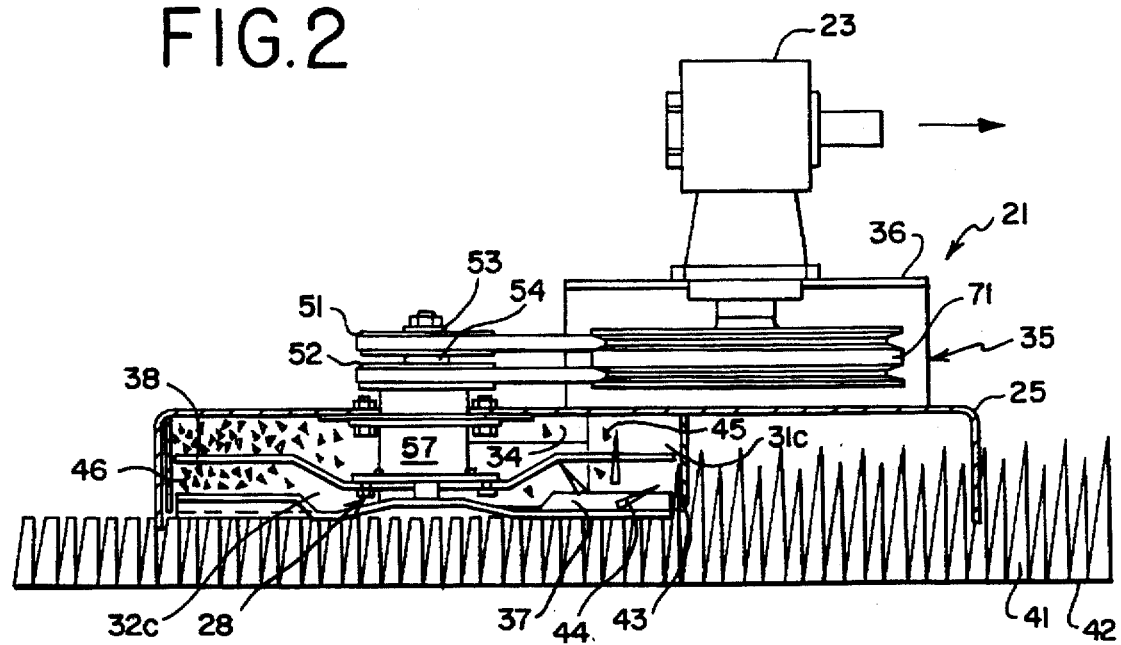
FIG. 2 is a somewhat schematic cross-sectional view through one of the counterrotation spindle assemblies and drive assembly of the finishing mower shown in FIG. 1.

With more particular reference to the illustrated baffle arrangement, each cutting swath location includes a front baffle component 31a, 31b and 31c, as well as a rear baffle component, 32a, 32b and 32c. Center baffle plates 33, 34 are positioned between front and rear baffle components. It is preferred that the center plates 33, 34 have a relatively short height, as can be seen in FIGS. 1 and 2. This permits some distribution of cuttings and air between adjoining swath paths while still encouraging retention of cuttings within individual swath path enclosures. In order to facilitate ingress of vegetation into each swath path enclosure, the front baffles can be slightly shorter than the rear baffles, as generally illustrated in FIG. 2. This difference in height may be on the order of about ½ inch to about 1 inch.

A driving belt assembly, generally designated as 35, transmits rotational power from the power supply, such as the illustrated gearbox 23 on the mounting stand 36. By operation of the driving belt assembly 35, the rotational power is transformed from rotation in a single direction to rotation in both the clockwise direction and the counterclockwise direction, which rotational direction is separately imparted to each cutting spindle assembly. As a result, one of the cutting components on each spindle assembly rotates in a clockwise direction, while the other cutting component rotates in the counterclockwise direction.

More particularly, each cutting spindle assembly includes a lower cutting blade 37 and an upper mulching tool 38 which rotate in opposite rotational directions. As generally illustrated in FIG. 2, the finishing mower 21 passes through a stand of vegetation such as illustrated grass blades 41 growing from ground 42. As the blades pass under front baffle component 31c, they are first encountered by the lower cutting blade 37. In this regard, a clearance area 43 is provided between the bottom of the lower cutting blade 37 and the bottom of the front baffle, a typical clearance area being on the order of 1 inch or less. Resulting cut grass blades 44 are thrown generally upwardly, to and into the upper mulching tool 38. At this location, the cut grass blades are generally reversed in direction to enhance mulching action. The cut grass blades are then further cut into grass blade slivers 45 or the like. Mulched grass clippings 46 are thus formed and deposited into the thus cut turf.

Figure 4:
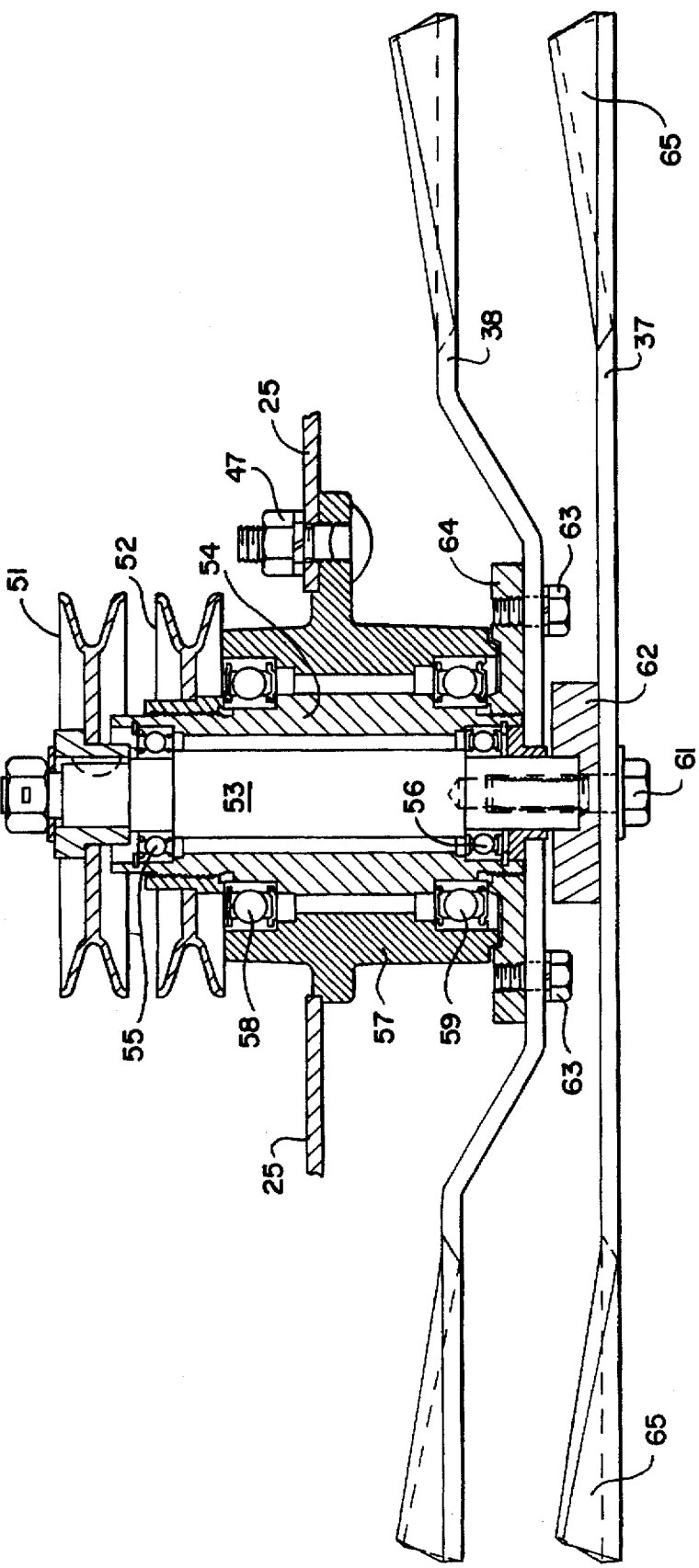
FIG. 4 is a generally cross-sectional view through one of the spindle assemblies of the embodiment illustrated in FIG. 1.

FIG. 4 illustrates a preferred spindle assembly in accordance with the present invention. The driving belt assembly (not shown in FIG. 4) drivingly engages an upper sheave 51 in one direction and a lower sheave 52 in the opposite rotational direction. Upper sheave 51 is secured to and drives driven output shaft or inner shaft 53, and lower driven sheave 52 is secured to and drives output tube or outer barrel 54. It will be noted that driven output shaft 53 passes through driven output tube 54, their relative rotation being facilitated by upper bearing assembly 55 and lower bearing assembly 56. It will further be noted that output tube 54 is rotatably mounted within spindle housing 57 by upper bearing assembly 58 and lower bearing assembly 59. The spindle housing 57 is suitably mounted to the deck assembly 25, such as by illustrated bolt assembly 47.

Upper mulching tool 38 is releasably secured to the driven output tube 54, while the lower blade assembly 37 is releasably secured to the driven output shaft 53. Due to the action of the driving belt assembly, the upper driven sheave 51 and the lower driven sheave 52 will rotate in opposite directions along the same axis. This rotational movement is in turn transmitted to the mulching tool 38 and the blade 37, respectively, through the driven output shaft 53 and the driven output tube 54, respectively. The result is coaxial counterrotation of the upper mulching tool and the lower blade assembly with respect to each other in the same spindle assembly.

Driven output shaft 53 is mounted within and between the two bearing assemblies 55 and 56. Similarly, the driven output tube 54 is mounted within and between the two bearing assemblies 58 and 59. Preferably, these bearing assemblies are sealed bearings which require no additional lubrication for the life of the bearings.

Concerning mounting of the lower cutting blade 37, same can be accomplished by bolt assembly 61 including a spacer washer 62 which includes a countersink bore as shown in order to provide solid mounting of the lower cutting blade which will withstand sudden impacts, such as when the lower cutting blade 37 encounters a pipe, rock or the like. Mounting of the upper mulching tool 38 includes bolts 63 and a mounting plate 64.

Lower cutting blade 37 preferably includes an uplift section 65 at the tip portions of the blade. This facilitates throwing of the cut grass blades upwardly into the upper mulching tool 38.

Further details of the driving belt assembly are found in FIG. 5 through FIG. 10. These drawings illustrate a driving belt assembly that utilizes a two-belt driving arrangement, although single-belt drive arrangements are also possible by appropriate belt feeding pathways, for example using a tilted idler arrangement in the nature of that shown in U.S. Pat. No. 2,614,440 to Richey. For simplicity of description, the two-belt drive arrangement will be described in detail. In this arrangement, a double-grooved drive sheave 71 is in driven engagement with the gearbox 23 or other power source as discussed herein.

FIG. 9 illustrates a typical upper belt drive, while FIG. 10 illustrates a typical lower belt drive. Upper belt drive incorporates a drive belt 72 which is in driving engagement with upper driven sheaves 51a, 51b and 51c, as well as the lower cutting blades 37 associated therewith. Idlers 73 and 74 are provided. In this particular arrangement, each drive spindle 51a, 51b and 51c moves in the same rotational direction as does the drive sheave 71, the illustrated direction being clockwise.

FIG. 10 includes drive belt 75 for driving the lower driven sheaves 52a, 52b and 52c. With this arrangement, while the driven sheave 71 rotates clockwise, the lower drive belt 75, the spindle sheaves 52a, 52b and 52c, and the associated upper mulching tools 38 rotate in the counterclockwise direction. This portion of the driving belt assembly includes idlers 76, 77 and 78.

FIG. 5 illustrates idler assembly 78. It is rotatably mounted in conjunction with a bushing 79. This particular illustrated arrangement includes a tension adjuster 81 and an adjustment rod assembly 82. FIG. 6 shows a double idler assembly that includes both lower idler 73 and upper idler 74. Independent rotation of each is facilitated by spacers 83 and 84. FIG. 7 further illustrates the larger idler 76 included in the lower portion of the driving belt assembly. FIG. 8 further illustrates a counterrotating spindle assembly in accordance with the present invention. In an illustrated arrangement, the tip speed of the lower cutting blade is about 18,500 feet per minute, while the tip speed of the upper mulching tool is about 17,730 feet per minute.

FIG. 11 shows an alternative structure for an upper mulching tool. It includes a support bar 85 and a plurality of tines 86, 87, 88 at different angular orientations with respect to the bar 85. FIG. 12 illustrates an upper mulching tool 89 having three different staggered or offset cutting surfaces 91, 92, 93. FIG. 13 illustrates an upper mulching tool 94 having its tip ends which are split and formed into an upwardly directed member 95 and a downwardly directed member 96. FIG. 14 shows a mulching device for mounting as the upper mulching tool. It includes multiple curved blade fingers 97 positioned around a central portion 98. Other alternative upper mulching tools can include rotating twine or string, flails and the like.

Comparative Examples

A finishing mower of the type generally illustrated in FIGS. 1–10 and having a total cutting swath of about 5 and 6 feet was tested, including tests on a side-by-side basis with commercially available finishing mowers. The device in accordance with the invention successfully mowed heavy Bluegrass, heavy fine leaf Bluegrass, heavy broad leaf fescue and heavy fine leaf fescue, removing up to 2½ inches of plant growth and shredding the mulch to eliminate any visible discharge. The mulching finishing mower in accordance with the present invention also successfully cut golf course "rough", removing two inches or more of substantial plant growth, fescue and crab grass. The mower was pulled by a tractor having a PTO rated at 25 horsepower. The mower also successfully cut grass growth between 6 inches and 7 inches tall with dead brown undergrowth, the cutting height being set at 2 inches. The result was a clean cut with the mulched and shredded material distributed across the cutting width.

Comparative finish mower testing was carried out at a high quality sod turf farm. The finishing mower according to the present invention successfully cut fescue sod turf that was 5 inches tall and thick, the cutting height being set at 2½ inches. The result was a finely shredded mulch that was almost invisible. A 22-foot Progressive tri-deck mower had been run under similar conditions and deposited large clumps of vegetation material in windrows.

A lawn of broad leaf fescue of about 3½ inches high was mowed with a Kubota belly-mounted 5-foot side discharge mower set at a 2-inch cutting height. The 5-foot unit in accordance with the present invention was set to the same cutting height and run at the same mowing speed, namely 3.04 miles per hour. Both units performed equally in terms of cutting performance. However, the commercial Kubota unit was discharging material out of the side discharge, while the unit in accordance with the present invention was shredding the material so as to leave no visible cut vegetation.

Another comparative test was conducted on heavy fescue and crab grass which was about 4½ inches tall. A 17 foot Woods tri-deck mower, which was set at a 2 inch cutting height, left windrows of cut material with some clumps of grass. The 5-foot turf mower in accordance with the present invention ran beside this area at the same height and at 4.38 miles per hour to achieve good cutting and shredding, while leaving no visible cut vegetation material.

It will be understood that the embodiments of the present invention which have been described are illustrative of some of the applications of the principles of the present invention. Various modifications may be made by those skilled in the art without departing from the true spirit and scope of the invention.

I claim:

1. A mulching finishing mower with dual counterrotating cutting assemblies for cutting and mulching turf vegetation, the mower comprising:

a deck assembly associated with at least one ground engagement member and an assembly for transporting the mower across a field of vegetation to be cut and mulched;

a lower blade rotatably mounted along said deck assembly so as to engage and cut vegetation over which said mower moves and which passes generally under said deck assembly;

an upper mulching tool rotatably mounted along said deck assembly so as to engage and mulch vegetation over which said mower moves and into which vegetation is propelled thereinto by said lower blade, said upper mulching tool being above said lower blade;

a belt drive assembly secured to said deck assembly, said belt drive assembly simultaneously driving both said lower blade and said upper mulching tool;

said belt drive assembly including a rotatably mounted driven output shaft in driving engagement with said lower blade and a rotatably mounted driven output tube in driving engagement with said mulching tool, said output shaft passing through said output tube, and said lower blade and said upper mulching tool being driven respectively by said output shaft and output tube in counterrotation with respect to each other;

said belt drive assembly includes a driven sheave for the lower blade which driven sheave is secured to an upper portion of said output shaft;

said belt drive assembly includes a driven sheave for the upper mulching tool, which driven sheave is secured to an upper portion of said output tube;

a main drive sheave assembly which is rotatably powered by a rotational power supply assembly; and said belt drive assembly drivingly engages each of said main drive sheave, said driven sheave for the upper mulching tool and said driven sheave for the lower blade, said belt drive assembly thereby drivingly joining together said main drive sheave and said driven sheave for the mulching tool in order to rotate said mulching tool in one rotational direction, and said belt drive assembly also thereby drivingly joining together said main drive sheave and said driven sheave for the lower blade in a counterrotational direction opposite to that of said one rotational direction of the mulching tool.

2. The mulching mower in accordance with claim 1, wherein said output tube and said upper mulching tool are removably secured to one another so that said upper mulching tool is removable without removal of or damage to said output tube or to said upper mulching tool.

3. The mulching mower in accordance with claim 1, wherein said lower blade and said mulching tool are included within a spindle assembly, and said mulching mower has a plurality of said spindle assemblies spaced from each other on said deck assembly.

4. The mulching mower in accordance with claim 1, wherein said deck assembly includes a baffle arrangement including a front baffle component and a rear baffle component, with the front baffle component having a height shorter than that of the rear baffle component.

5. The mulching mower in accordance with claim 3, wherein each spindle assembly is generally within the perimeter of a baffle assembly secured to the deck assembly, each baffle assembly having a front baffle component and a rear baffle component, said baffle assembly further including a center baffle plate joining adjacent front baffle components to adjacent rear baffle components of different spindle assemblies.

6. The mulching mower in accordance with claim 1, wherein said belt drive assembly transforms single-direction rotational power from the rotational power supply into rotation in both the clockwise direction and the counterclockwise direction of the respective driven sheaves.

7. The mulching mower in accordance with claim 1, wherein said lower blade throws cut vegetation generally upwardly, to and into the upper mulching tool which generally reverses the direction of flow of the cut vegetation, whereby mulching action of the mulching mower is enhanced.

8. The mulching mower in accordance with claim 1, wherein said belt drive assembly includes a driving sheave and belting joining same with said driven sheaves.

9. The mulching mower in accordance with claim 3, wherein said belt drive assembly includes a driving sheave component having an upper driving sheave and a lower driving sheave which rotate in the same direction, the belt drive assembly further including two belts, one of said belts drivingly joining the upper driving sheave with the respective driven sheave for the lower blade of each spindle assembly, and the other of said belts drivingly joining said lower driving sheave with said respective driven sheave for the mulching tool of each spindle assembly, whereby said one belt effects rotational movement of each of said lower blades in one direction while said other belt effects rotational movement of each of said upper mulching tools in the opposite rotational direction on each spindle.

10. The mulching mower in accordance with claim 1, wherein said upper mulching tool is a blade-like member.

11. The mulching mower in accordance with claim 1, wherein said upper mulching tool includes a plurality of tines at different angular orientations.

12. The mulching mower in accordance with claim 1, wherein said upper mulching tool has tip portions including a plurality of staggered cutting surfaces which are offset with respect to each other.

13. The mulching mower in accordance with claim 1, wherein said upper mulching tool has split tip ends.

14. The mulching mower in accordance with claim 1, wherein said upper mulching tool includes multiple curved blade fingers positioned around a central portion.

* * * * *